United States Patent [19]
McCollum et al.

[11] Patent Number: 6,006,228
[45] Date of Patent: *Dec. 21, 1999

[54] ASSIGNING SECURITY LEVELS TO PARTICULAR DOCUMENTS ON A DOCUMENT BY DOCUMENT BASIS IN A DATABASE

[75] Inventors: Tab McCollum, Camden; Thomas W. Jury, Beavercreek, both of Ohio

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/763,917

[22] Filed: Dec. 11, 1996

[51] Int. Cl.$^6$ .................................................. G06F 17/30
[52] U.S. Cl. .................................. 707/9; 707/1; 707/10; 707/104
[58] Field of Search ................................ 707/9, 10, 104, 707/200, 1; 1/1; 395/200.57, 188.01, 200.76, 187.01, 200.59, 200.12, 186, 200.49, 726; 345/326, 348; 380/4, 55, 23, 30, 3, 25; 379/89, 93.12, 93.23

[56] References Cited

U.S. PATENT DOCUMENTS

| | | | |
|---|---|---|---|
| 5,204,961 | 4/1993 | Barlow | 395/187.01 |
| 5,291,598 | 3/1994 | Grundy | 395/186 |
| 5,319,705 | 6/1994 | Halter et al. | 380/4 |
| 5,410,598 | 4/1995 | Shear | 380/4 |
| 5,596,718 | 1/1997 | Boebert et al. | 395/187.01 |
| 5,638,448 | 6/1997 | Nguyen | 380/29 |
| 5,684,951 | 11/1997 | Goldman et al. | 395/188.01 |
| 5,696,898 | 12/1997 | Baker et al. | 395/187.01 |
| 5,721,908 | 2/1998 | Lagarde et al. | 1/1 |

FOREIGN PATENT DOCUMENTS

| | | | |
|---|---|---|---|
| 0398645 | 11/1990 | European Pat. Off. | 15/40 |
| 0547990 | 6/1993 | European Pat. Off. | 12/14 |

OTHER PUBLICATIONS

C. R. Young, "A Security Policy for a Profile–Oriented Operating System", AFIPS Conference Proceedings, May 4–7, 1981, Chicago, IL,USA, pp. 273–282, XP00206007.

Andy Whitcroft et al., "A Tangled Web of Deceit", Computer Networks and ISDN Systems, vol. 2, No. 27, Nov. 1994, pp. 225–234 XP004037993.

Robert Godwin–Jones, "Interactive Webbing: CGI Scripting, Javascript and Linked Programs for Language Learning", Calico, Annual Symposium, Proceedings of the Computer Assisted Languare Instruction Consortium, Distance Learning, May 27, 1996, pp. 127–131, XP000617426.

*Primary Examiner*—Wayne Amsbury
*Assistant Examiner*—Srirama Channavajjala
*Attorney, Agent, or Firm*—Charlene Stukenborg

[57] ABSTRACT

A system and method for providing a security database for HTML documents in a World Wide Web application is provided. In particular, the database enables required security levels to be assigned to each HTML document individually. The database checks if the user has the required security level to access a particular HTML document. If the user has the required security level, then the HTML document is transmitted from the Web server to the user without any apparent (to the user) difference from the normal fashion. Thus, multiple HTML documents in a single server may have varying required security levels.

12 Claims, 5 Drawing Sheets

Microfiche Appendix Included
(1 Microfiche, 21 Pages)

| SECURITY LEVEL | USER GROUP | FILE NAME | HTML CODE |
|---|---|---|---|
| LO | 1, 2, 3 | INDEX.HTM | <HTML> |
| LO | 1 | LO-1.HTM | <HTML> |
| LO | 2 | LO-2.HTM | <HTML> |
| LO | 3 | LO-3.HTM | <HTML> |
| LO | 1, 2 | LO-12.HTM | <HTML> |
| LO | 1, 3 | LO-13.HTM | <HTML> |
| LO | 2, 3 | LO-23.HTM | <HTML> |
| LO | 1, 2, 3 | LO-123.HTM | <HTML> |
| MEDIUM | 1 | MED-1.HTM | <HTML> |
| MEDIUM | 2 | MED-2.HTM | <HTML> |
| MEDIUM | 3 | MED-3.HTM | <HTML> |
| MEDIUM | 1, 2 | MED-12.HTM | <HTML> |
| MEDIUM | 1, 3 | MED-13.HTM | <HTML> |
| MEDIUM | 2, 3 | MED-23.HTM | <HTML> |
| MEDIUM | 1, 2, 3 | MED-123.HTM | <HTML> |
| HI | 1 | HI-1.HTM | <HTML> |
| HI | 2 | HI-2.HTM | <HTML> |
| HI | 3 | HI-3.HTM | <HTML> |
| HI | 1, 2 | HI-12.HTM | <HTML> |
| HI | 1, 3 | HI-13.HTM | <HTML> |
| HI | 2, 3 | HI-23.HTM | <HTML> |
| HI | 1, 2, 3 | HI-123.HTM | <HTML> |

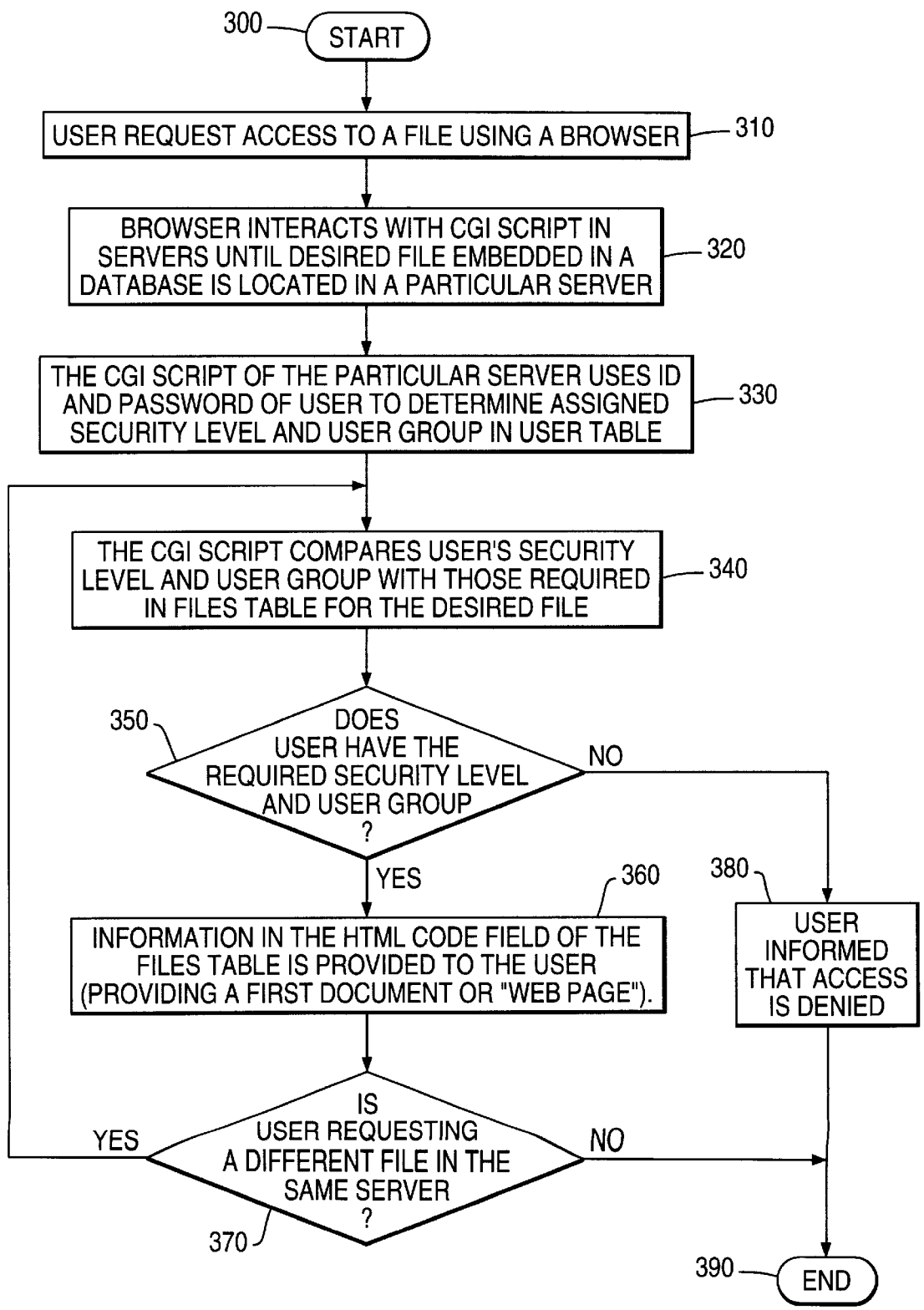

ASSIGNING SECURITY LEVELS TO PARTICULAR DOCUMENTS ON A DOCUMENT BY DOCUMENT BASIS IN A DATABASE

The present invention relates to a system and method for providing a security database for HTML (hypertext markup language) documents in a world wide web application. In particular, the security database allows security to be assigned to particular documents on a document by document basis.

REFERENCE TO A MICROFICHE APPENDIX

A microfiche appendix, containing one (1) microfiche and 21 total frames is filed herewith.

BACKGROUND OF THE INVENTION

With the increased number of internet users and the ease of accessibility of the World Wide Web, there is an increasing demand for the use of the Web as a vehicle for distributed applications. These distributed applications are composed of HTML documents and can be accessed by various Web browsers, such as Netscape Navigator or Microsoft Internet Explorer. Hypertext links relate the documents to each other and give users a way to navigate from one file to another.

These distributed applications require security to limit access to valid users. Currently, a typical approach to providing security for HTML documents requires the server directory and subdirectories where the HTML documents are located to be secured at the same level. This means that an individual user can have access to all the documents in the directory or access to none of the documents in the directory based on an appropriate user id and password. Another drawback of this typical approach is that this approach depends upon the naming convention used for the subdirectories and thus makes porting of the application (and all of the associated HTML documents) to another server difficult.

There is a need for a system and method for providing required security levels to particular documents in distributed applications on a document by document basis (or groups of documents or any combination).

SUMMARY OF THE INVENTION

In accordance with the teachings of the present invention, a system and method of providing a security database for HTML documents in a world wide web application are provided.

It is an important feature of the present invention that user access to individual HTML documents (or groups of documents) can be determined and controlled.

It is also an important feature of the present invention that the applications (or documents in an application) can be ported to other servers since the applications do not rely on the directory structure to provide security.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIGS. 3A and 3B are block diagrams of a File Table for use with the present invention; and FIG. 4 is a flowchart of the method of the present invention.

DETAILED DESCRIPTION OF THE INVENTION

A portion of the disclosure of this patent document contains material which is subject to copyright protection and to which a claim of copyright protection is made. The copyright owner has no objection to the facsimile reproduction by anyone of the patent document or the patent disclosure, as it appears in the Patent and Trademark Office patent files or records, but otherwise reserves all copyrights and similar rights whatsoever.

Figure 1:
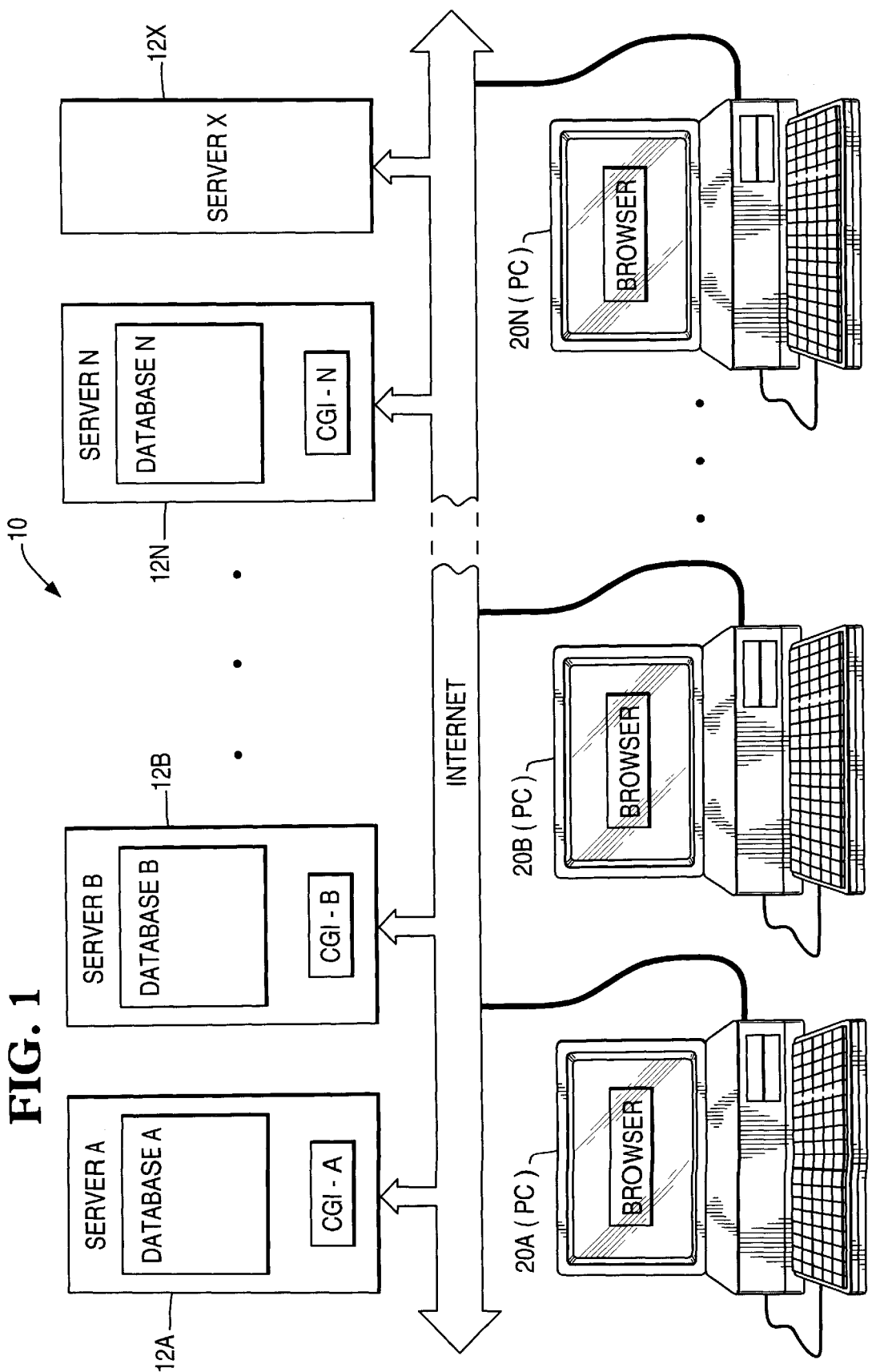
FIG. 1 is a block diagram of a system of the present invention.

Referring now to the drawings, in which like-referenced characters indicate corresponding elements throughout the several views, attention is first drawn to FIG. 1 which shows a block diagram of the system 10 for providing a security database for HTML documents in a WWW application. The system 10 includes a plurality of PCs 20A through 20N or other client terminals which have access to the Internet. PCs 20A through 20N include a web browser such as Netscape Navigator or Microsoft Internet Explorer. PCs 20A through 20N also include an input device such as a keyboard or a mouse and other standard components such as memory, display, microprocessor, etc.

The system 10 also includes a plurality of servers 12A through 12X or other large storage devices also connected to the Internet. Each server 12A, 12B , . . . 12N may include a database having specified files or the server may not initially include a database at all such as 12X. The databases included may be any commonly available databases. Examples include Access (available from Microsoft), Dbase (available for Ashton-Tate), etc. Each server 12A, 12B, 12N also includes a CGI (common gateway interface) script file (CGI-A, CGI-B, etc.) for passing information from the PCs via the browsers to the servers and from the servers via the browsers to the PCs. The required CGI script files can be built with just about any programming or scripting language (for example, C) that the user's servers support. The CGI code provides the interface with the server and passes and receives the information between the database in the server and the user terminal. A sample of CGI code is included at the end of this description. The sample CGI code also includes an invention-specific or customized module entitled "Module 2" which provides specific examples of code for checking security levels and granting access and downloading HTML files according to the present invention.

In discussing FIGS. 2, 3A and 3B, exemplary database A in server 12A will be described. This description applies to the other databases located in the other servers. Additionally, server 12X does not initially include a database. However, according to the present invention, any desired database from one of the other servers can be ported to server 12X without the difficulties normally encountered when moving or copying a grouping of files from one server to another server when the files are located in the directory structure.

Figure 2:
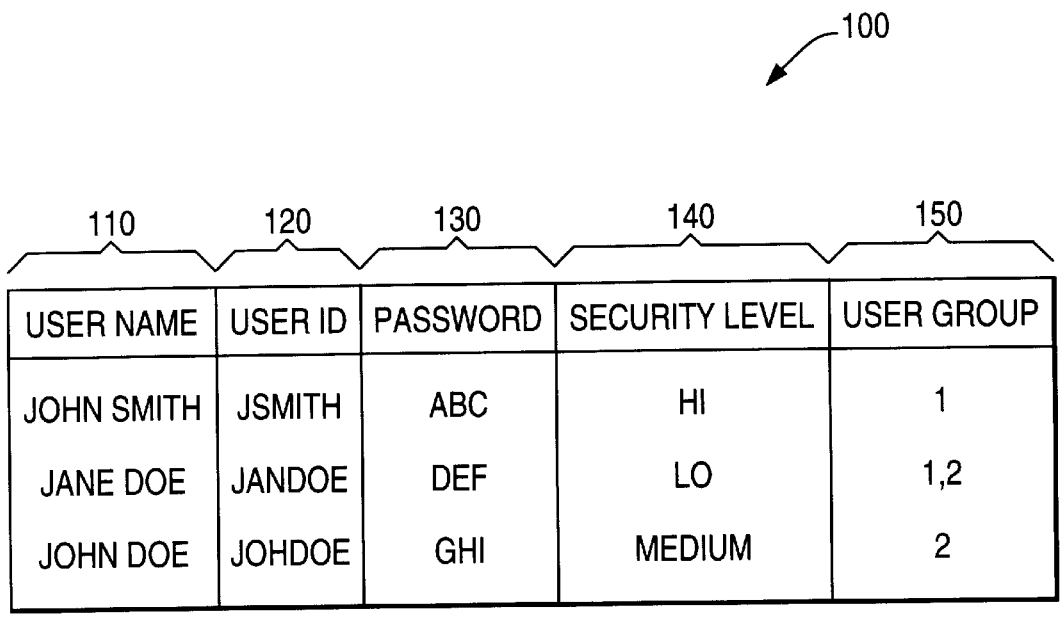
FIG. 2 is a block diagram of a User Table for use with the present invention.

Referring first to FIG. 2, database A includes a User Table 100 which is basically used to keep track of users. The User Table may include fields such as user name 110, user identification (id) 120, user password 130, user security level 140 and user group 150. Additional fields may be included or some of the above fields may be deleted as long as the User Table contains enough information to accurately identify a user requesting a document and provide the security level (or privileges) corresponding to that user.

Figure 3A:
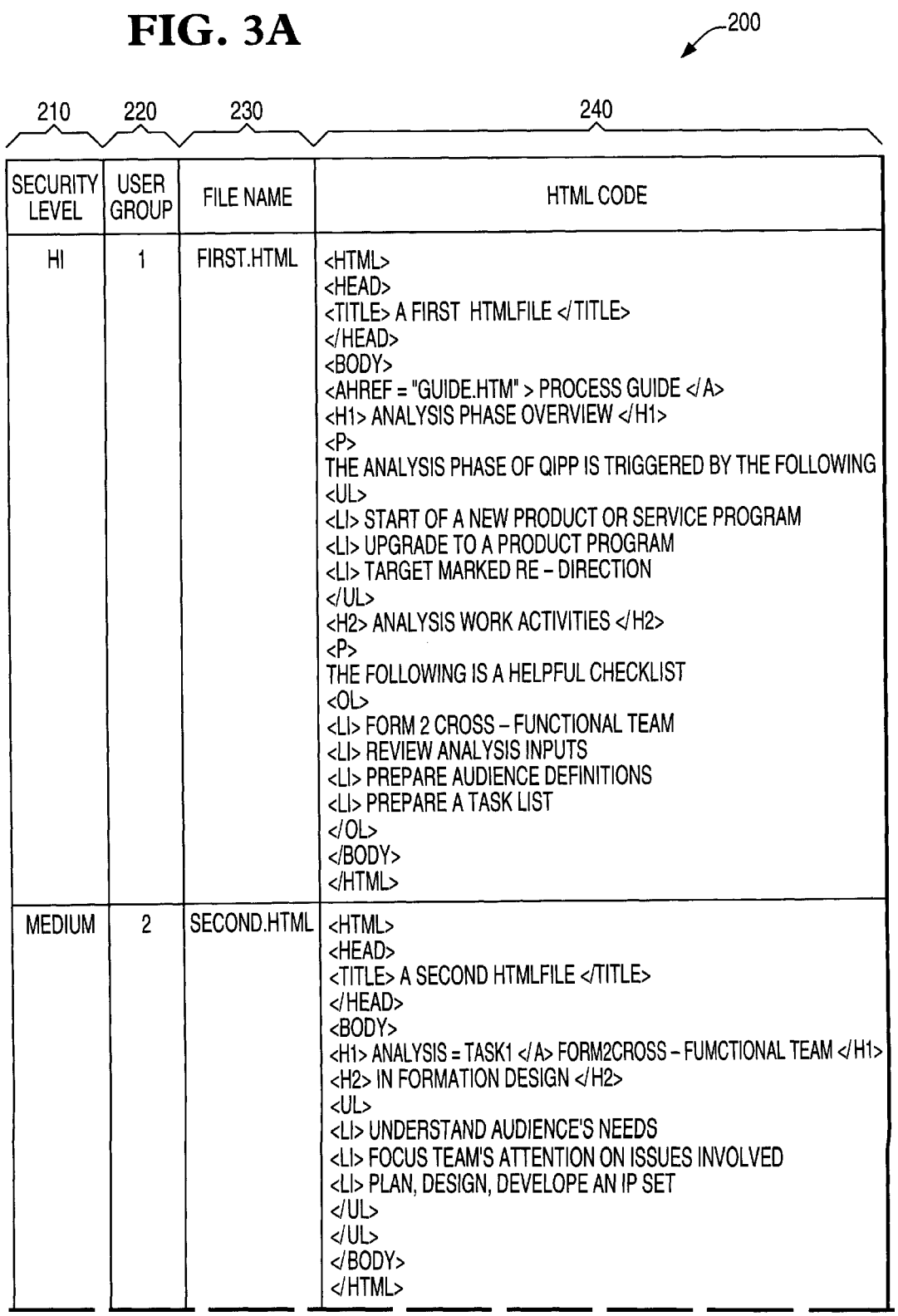

Referring next to FIGS. 3A and 3B, database A also includes a Files Table 200 which is basically used to control access to individual HTML documents. The Files Table 200 may include fields such as security level 210, user group 220, file name 230 and HTML code 240. Additional fields may be included or some of the above fields may be deleted as long as the Files Table contains enough information to accurately determine if a requested document is contained in the database and whether a user requesting a document should be given access to the document. If the user is given access, then the code (or file) in the HTML code field 240 is passed to the user (through the user's browser) To provide the HTML code field to the user, the customized CGI module passes the code (or file) to the user verbatim with the following exception. In any hypertext links to other documents, referenced by <A HREF=filename> HTML tags, the specific file name is replaced with a reference to the customized CGI module and the file name is appended as a parameter.

For example:
<A HREF="filename" is replaced with
<A HREF="invent.exe?Name=UserName&file=filename"

In this way the customized CGI module can interact with the user's web browser and invoke the correct hypertext link to other files in the database. This process allows the passing of the file to the user to occur without any noticeable difference from a server with security protection for the entire server or subdirectory because the user's inquiry for a specific HTML file calls the customized CGI module which handles the processing of the user's security level and user group and the file's required security level and user group. Thus, although the present invention provides flexibility in allowing access to various documents on a server, the user interface is virtually the same as standard systems which do not provide varying security levels for documents on the same server or in the same directory.

FIG. 4 shows a flowchart of the method for providing a security database for HTML documents in WWW applications. First in step 310, a user requests access to a file, preferably using a web browser. Then in step 320, the web browser interacts with cgi script files in servers 12A through 12N until the desired file, which is embedded in a database, is located in a particular server. Alternatively, a user could request a list of all files located in a particular database and select a desired file from that list. Next in step 330, the cgi script file of the particular server uses the user id and the user password to determine the assigned security level and user group in the User Table 100.

Then in step 340, the cgi script file compares the user's security level and user group with those required in the Files Table 200 corresponding to the desired file. In step 350, it is determined whether the user has the required security level and user group to access the desired file. If yes, then in step 360, the information in the HTML Code field 240 of Files Table 200 is provided to the user's browser as described above. Thus the user is provided a first document or web page. If the user requests a different file in the same server then in step 370, the step of comparing the user's security level and user group with those required in the Files Table 200 corresponding to the new desired file is performed. If the user does not request a different file in the same server then the process is ended in step 390. (Of course, if the user requests access to a file in another server, then the user's browser must interact with the cgi script files in all the servers until the desired file embedded in the database of the new server is located.)

If a user requests access to a document and does not have the required security level and user group for the desired document, then the user is informed that access has been denied in step 380. Then the process ends in step 390.

An advantage of the present invention is that user access to individual HTML documents (or groups of documents) can be determined and controlled.

Another advantage of the present invention is that applications (or documents in an application) can be ported to other servers since the applications do not rely on the directory structure to provide security. Rather the documents are located in the database.

Although the invention has been described with the use of an example CGI script file and related customized module of the CGI file, it is contemplated that any coding which provides the functions as discussed with respect to the above files is contemplated within the scope of the present invention. Additionally, although the program providing the fields has been described as a database, any program which can provide fields to be accessed and compared according to the description is contemplated within the scope of the present invention.

Although the invention has been described with particular reference to certain preferred embodiments thereof, variations and modifications of the present invention can be effected within the spirit and scope of the following claims.

What is claimed is:

1. A system for providing security on a document by document basis for documents stored in a shared server, the system comprising:
    a database stored in the shared server, said database having user information, file information and means for determining and providing access to a portion of said file information based on said user information and said file information wherein portions of said file information comprise documents and wherein each of said documents can be secured at different security levels from other documents within said database and wherein said database is accessible by any user computer and access to a particular document is determined by information passed to said database from the user computer.

2. The system of claim 1 wherein said user information is in a first table and said file information is in a second table.

3. The system of claim 1 wherein the means for determining and providing access to a portion of said file information based on said user information and said file information is included in a common gateway interface file.

4. The system of claim 1 wherein said user information includes a user identification name, a user password, and a security level.

5. The system of claim 1 wherein said file information includes a security level, a file name and code for creating a document.

6. The system of claim 5 wherein a first security level corresponding to a first file name is higher than a second security level corresponding to a second file name.

7. A computer system comprising:
    a plurality of terminals including a browser and an internet connection; and
    a plurality of servers including an internet connection, each of said servers having a database having user information, file information, and means for determining and providing access to a portion of said file information based on said user information and said file information wherein portions of said file information comprise documents and wherein each of said documents can be secured at different security levels from other documents within said database and wherein said database is accessible by any user computer and access to a particular document is determined by information passed to said database from the user computer.

8. The system of claim 7 wherein said user information is in a first table and said file information is in a second table.

9. The system of claim 7 wherein the means for determining and providing access to a portion of said file information based on said user information and said file information is included in a common gateway interface file.

10. The system of claim 7 wherein said user information includes a user identification name, a user password, and a security level.

11. The system of claim 7 wherein said file information includes a security level, a file name and code for creating a document.

12. A method of providing security on a document by document basis for documents stored in a shared server, comprising the steps:

requesting access to a document located on one server of a plurality of shared servers;

locating the shared server which includes the document;

using user information to determined assigned user security values;

comparing the assigned user security values with required security values to access the document; and providing information in a code portion of file information if the assigned user security values are equal to or above the required security values to access the document wherein portions of said file information comprise documents and wherein each of said documents can be secured at different security levels from other documents within said database and wherein said database is accessible by any user computer and access to a particular document is determined by information passed to said database from the user computer.

* * * * *